(12) United States Patent
Thornsberry (10) Patent No.: US 7,543,873 B1
(45) Date of Patent: Jun. 9, 2009

(54) ROLL-OUT DRAWER SYSTEM FOR A VEHICLE

(76) Inventor: Joseph Warren Thornsberry, 9905 Northridge Dr., Louisville, KY (US) 40272

( * ) Notice: Subject to any disclaimer, the term of this patent is extended or adjusted under 35 U.S.C. 154(b) by 223 days.

(21) Appl. No.: 11/608,594

(22) Filed: Dec. 8, 2006

(51) Int. Cl.
  *B62D 39/00* (2006.01)
(52) U.S. Cl. .................. 296/26.09; 296/26.08; 224/403; 224/542
(58) Field of Classification Search .............. 296/37.1, 296/37.8, 37.14, 37.16, 26.01, 26.08, 26.09; 224/403, 542; 214/83.24
See application file for complete search history.

(56) References Cited

U.S. PATENT DOCUMENTS

| | | | |
|---|---|---|---|
| 437,885 A | 10/1890 | Bryant | |
| 549,954 A | 11/1895 | Bunnell | |
| 1,363,945 A | 12/1920 | Williams | |
| 1,389,642 A | 9/1921 | Ollie | |
| 1,633,364 A | 6/1927 | Carvalho | |
| 2,148,245 A | 2/1939 | Runkle | |
| 2,370,489 A | 2/1945 | Reed | |
| 2,529,558 A | 11/1950 | Klingebiel | |
| 2,549,018 A | 4/1951 | Sarlo | |
| 2,788,137 A | 4/1957 | Harkness | |
| 2,797,828 A | 7/1957 | Fritsche | |
| 3,006,487 A | 10/1961 | Geli | |
| 3,028,025 A | 4/1962 | White | |
| 3,055,709 A | 9/1962 | Krikwood | |
| 3,084,816 A | 4/1963 | Bozio | |
| 3,376,989 A | 4/1968 | Hilbun | |
| 3,471,045 A | 10/1969 | Panciocco | |
| 3,726,422 A | 4/1973 | Zelin | |
| 3,768,673 A | 10/1973 | Nydam et al. | |
| 3,888,539 A | 6/1975 | Niessner | |
| 3,915,496 A | 10/1975 | Mabry, Jr. | |
| 4,475,760 A | 10/1984 | Morgan | |
| 4,647,110 A | 3/1987 | McKee | |
| 4,681,371 A | 7/1987 | Leonard | |
| 4,685,857 A | 8/1987 | Goeser et al. | |
| 4,830,242 A | 5/1989 | Painter | |
| 4,841,883 A | 6/1989 | Kukovich, Jr. | |
| 4,909,558 A | 3/1990 | Roshinsky | |
| 4,950,123 A | 8/1990 | Brockhaus | |
| 4,990,049 A | 2/1991 | Hargrove | |
| 4,993,088 A | 2/1991 | Chudik | |
| 5,052,878 A | 10/1991 | Brockhaus | |
| 5,064,335 A | 11/1991 | Bergeron et al. | |
| 5,098,146 A | 3/1992 | Albrecht et al. | |
| 5,127,697 A | 7/1992 | St. Marie | |
| 5,184,931 A | 2/1993 | Safko | |
| 5,368,210 A | 11/1994 | Wotring | |
| 5,454,684 A | 10/1995 | Berens | |
| 5,513,941 A | 5/1996 | Kulas et al. | |
| 5,544,998 A | 8/1996 | Malinowski | |
| 5,649,731 A | 7/1997 | Tognetti | |
| 5,820,190 A | 10/1998 | Benner | |
| 5,848,818 A | 12/1998 | Flueckinger | |

(Continued)

*Primary Examiner*—Lori L Lyjak (57) ABSTRACT

A roll-out drawer system for a vehicle comprising a planar framework comprising a plurality of pipe-over-pipe mechanisms. The roll-out drawer travels over the planar framework permitting the drawer to travel lengthwise from an internal position within the bed of the vehicle to an external position where the drawer is partially extended from the bed. The pipe-over-pipe planar framework permits the user to gain access to the drawer to load, position and unload contents that would otherwise be difficult to reach within the bed of the vehicle.

19 Claims, 6 Drawing Sheets

U.S. PATENT DOCUMENTS

| | | |
|---|---|---|
| 5,934,725 A | 8/1999 | Bowers |
| 5,938,262 A | 8/1999 | Mills |
| 5,944,371 A | 8/1999 | Steiner |
| 6,065,792 A | 5/2000 | Sciullo et al. |
| 6,312,034 B1 | 11/2001 | Coleman, II et al. |
| 6,464,274 B2 | 10/2002 | Mink et al. |
| 6,491,331 B1 | 12/2002 | Fox |
| 6,698,634 B2 | 3/2004 | Thomson |
| 6,705,656 B2 | 3/2004 | Keller |
| 6,758,508 B2 | 7/2004 | Weyhrich |
| 6,840,558 B1 | 1/2005 | Darbishire et al. |
| 6,860,536 B1 | 3/2005 | Schimunek |
| 6,883,649 B2 | 4/2005 | Hebert |
| 6,883,849 B2 | 4/2005 | Hebert |
| 6,976,720 B1 | 12/2005 | Bequette |
| 7,083,219 B1 * | 8/2006 | Gregory ................ 296/100.12 |

* cited by examiner

ROLL-OUT DRAWER SYSTEM FOR A VEHICLE

TECHNICAL FIELD

The present invention relates to a roll-out drawer system in particularly to a roll-out drawer system traveling on a plurality of pipe-over-pipe mechanisms.

DETAILED DESCRIPTION

A roll-out drawer system 10 according to one embodiment of the present invention depicted in the drawings permits a slidable drawer 30 to travel from an internal position (FIG. 1) within the bed 2 of the vehicle 1 to an external position (FIG. 2) where the drawer is partially extending out from the vehicle bed. When the drawer 30 is in the external position (FIG. 2), the user can conveniently load or unload contents beyond the vehicle bed 2 area into the extended drawer 30 that would otherwise be more difficult to position in the original vehicle bed area.

Figure 1:
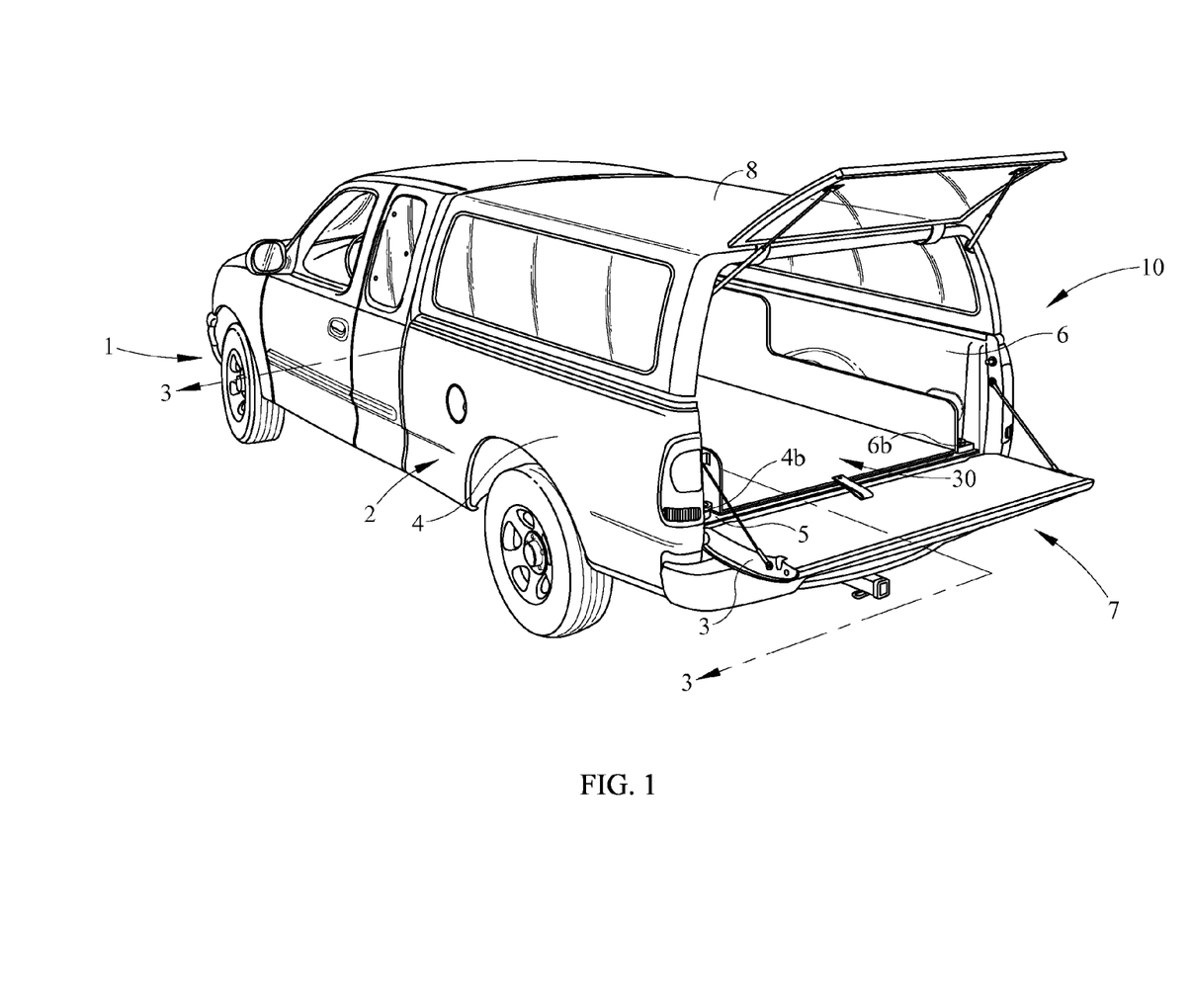
FIG. 1 is a top perspective view of a pickup truck with the roll-out drawer system in an internal position.
Figure 2:
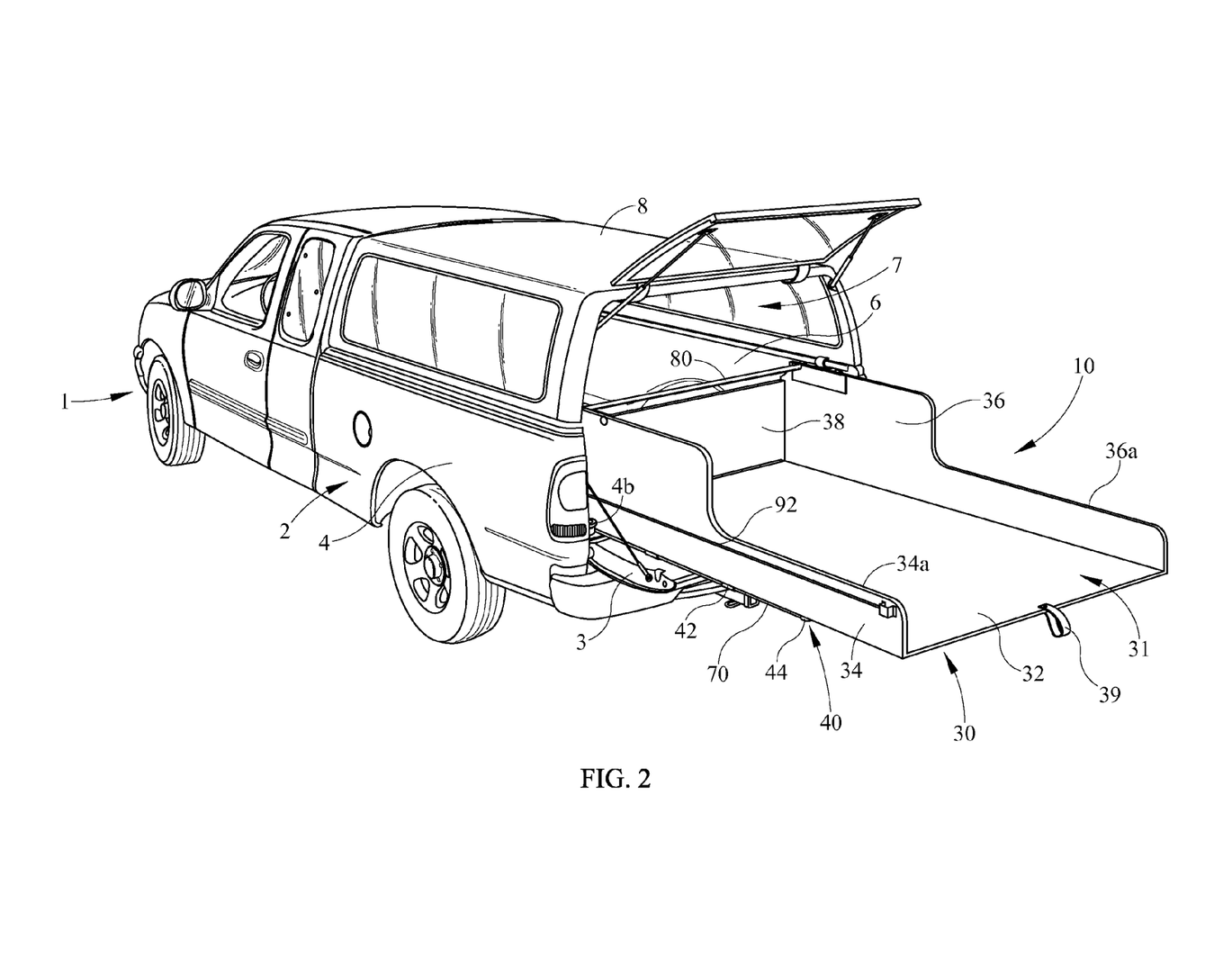
FIG. 2 is a top perspective view of the pickup truck with the roll-out drawer system of FIG. 1 in an external position.
Figure 3:
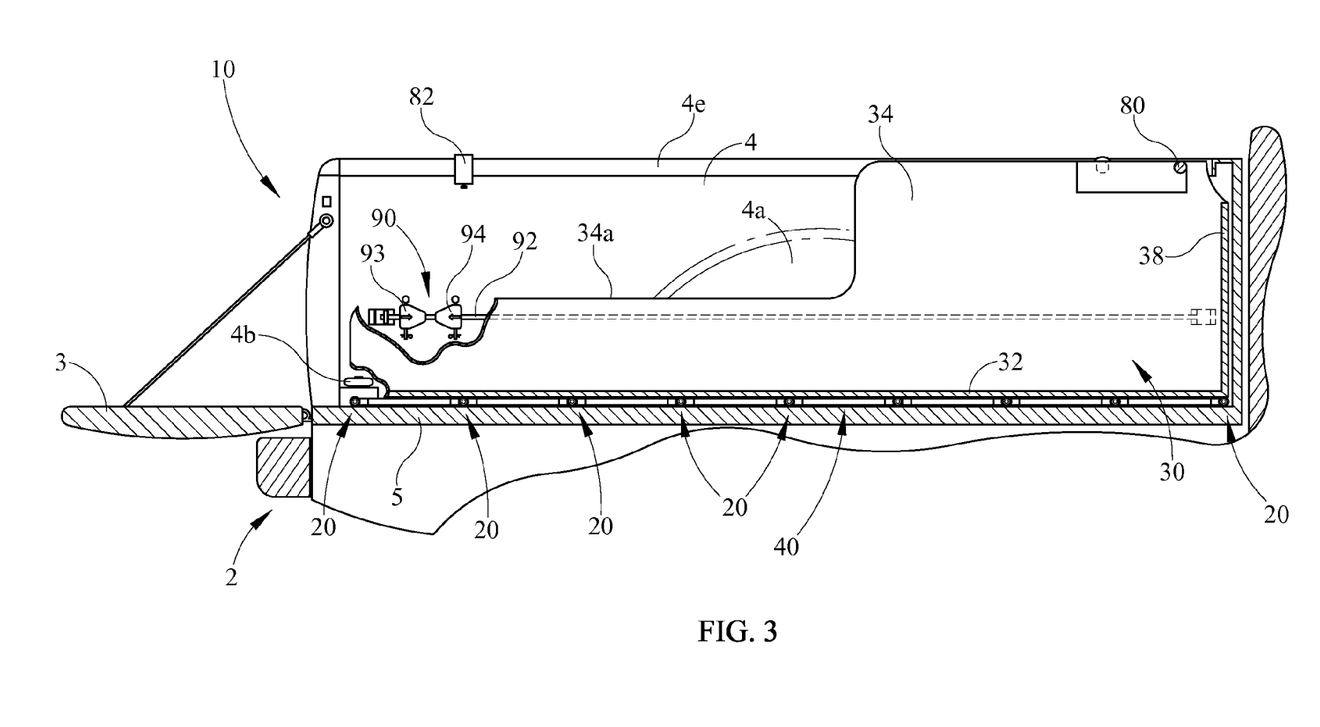
FIG. 3 is an enlarge partial sectional view of the roll-out drawer system of FIG. 1 taken along line 3-3 with the drawer and vehicle partially broken away.

As shown in FIGS. 1 and 2, the roll-out drawer system 10 includes vehicle 1, illustrated as a pickup truck, having bed 2 with a tailgate 3. Tailgate 3 pivots from bed 2 creating an opening 7 and a substantially continuous plane across the top surface of bed floor 5 and continues across the top surface of the tailgate. As shown in FIG. 1, vehicle 1 has a truck topper 8 or may have a similarly enclosed bed such as in a sport utility vehicle or van (not shown), each creating an obstacle to readily access the full length of bed 2. Alternatively, even if a truck topper 8 is not used, still a user will have difficulty reaching over left and right side walls 4 and 6 of bed 2 to load and position contents. Reaching over an opened, as well as an unopened, tailgate 3 to load or unload items in bed 2 may be difficult because of the limited reach by a user into the bed. Drawer 30 is extendable beyond the original truck bed floor 5 area and side walls 4 and 6 and/or topper 8, permitting drawer 30 to be readily loaded or unloaded. Then, extended drawer 30 may be returned to its original internal position (FIG. 1) within bed 2 of truck 1.

Figure 5:
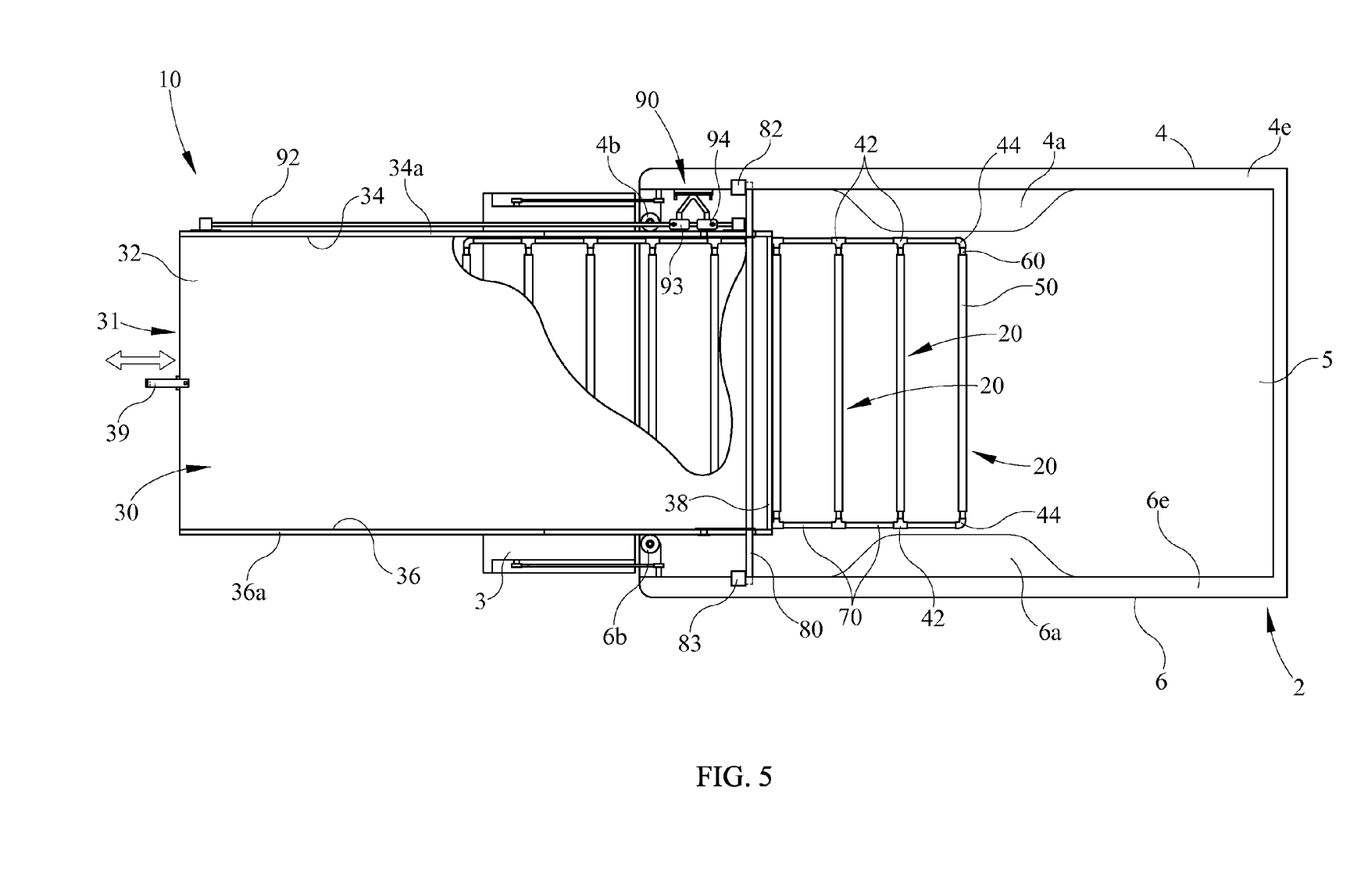
FIG. 5 is a partial top view of the roll-out drawer system of FIG. 2 in an external position with the drawer partially broken away.

As shown in FIGS. 2 and 5, drawer 30 partially extends beyond bed floor 5 area permitting the user increased accessibility to drawer 30 which in effect forms a truck bed extension. Drawer 30 is elongated and may span the width of bed floor 5 between a pair of wheel wells 4a and 6a. Drawer 30 may be constructed from, but not limited to, wood/fiberboard or other materials such as metal or plastics. A medium density fiber board would be suitable. Drawer 30 contains a bottom panel 32 and may also include additional panels comprising a rear panel 38, a left panel 34, and a right panel 36. Bottom panel 32 is positioned parallel to bed floor 5 of bed 2. Right panel 36 and left panel 34 are parallel and both project upward from opposite sides of bottom panel 32. Rear panel 38 projects upward from the back of bottom panel 32 and connects left panel 34 to right panel 36. An open front end 31 of drawer 30 is opposite rear panel 38, in the direction of tailgate 6. Each left panel 34 and right panel 36 includes a cut-away section respectively forming dropped edges 34a and 36a adjacent to open front end 31 of drawer 30. Dropped edges 34a and 36a permit the user to have increased access to ingress and egress items into and out of the extended drawer 30. Also, drawer 30 may include at least one grasping device such as a strap or handle 39 to assist the user in inwardly or outwardly extending the drawer in relation to bed floor 5. Grasping device 39 is shown in FIGS. 1, 2, and 5 as being a looped strap extending out from bed floor 5 adjacent open front end 31. Each drawer 30 and grasping device 39 may be provided in a variety of shapes, sizes, constructions, or configurations and still be within the scope of the embodiments contemplated herein.

Drawer 30 travels upon a plurality of pipe-over-pipe mechanisms 20 joined together in a planar framework 40, as more fully described below. As shown in FIGS. 4A, 4B, 5, and 6, each pipe-over-pipe mechanism 20 includes a first rotatable pipe or hollow cylinder 50 disposed around a second fixed pipe or hollow cylinder 60. First pipe 50 is aligned with its axis A parallel to the axis A' of second pipe 60 of the pipe-over-pipe mechanism 20. The inner diameter 52 of first pipe 50 is somewhat larger than the outer diameter 62 of second pipe 60 leaving a clearance C, as depicted in FIG. 4B, between first pipe 50 and second pipe 60 in use. This permits the first pipe to freely rotate about the second pipe. First pipe 50 and second pipe 60 may be constructed from, but not limited to, such materials as PVC pipe, aluminum, steel, or combinations of other materials as for example metals or plastics known in the art.

Figure 4A:
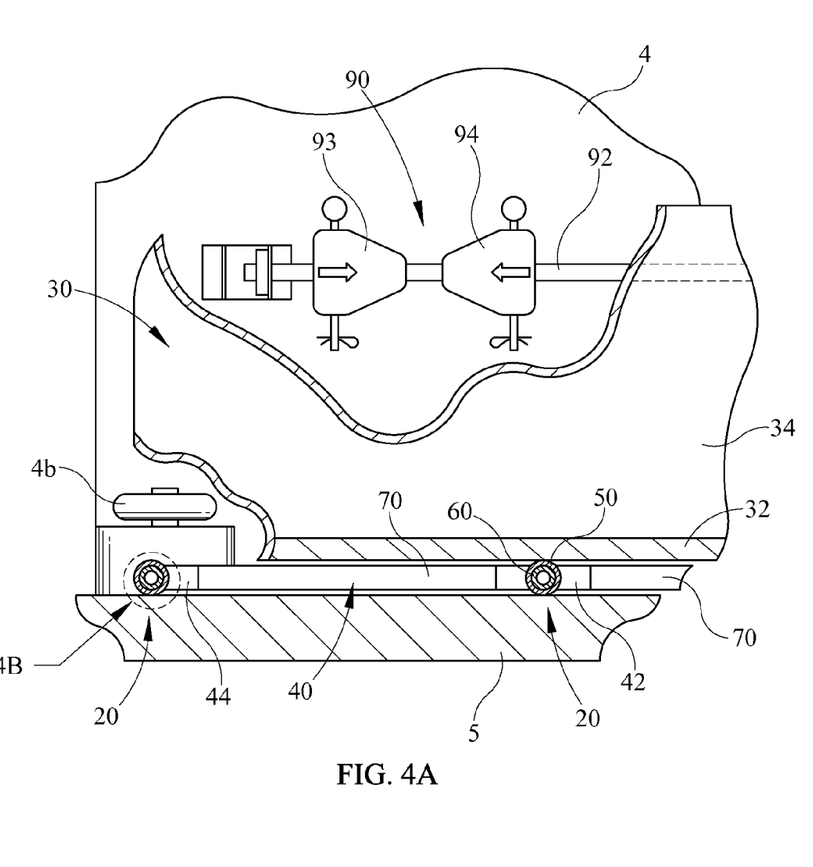
FIG. 4A is an enlarged partial sectional view of the roll-out drawer system of FIG. 3 with the drawer partially broken away.
Figure 4B:
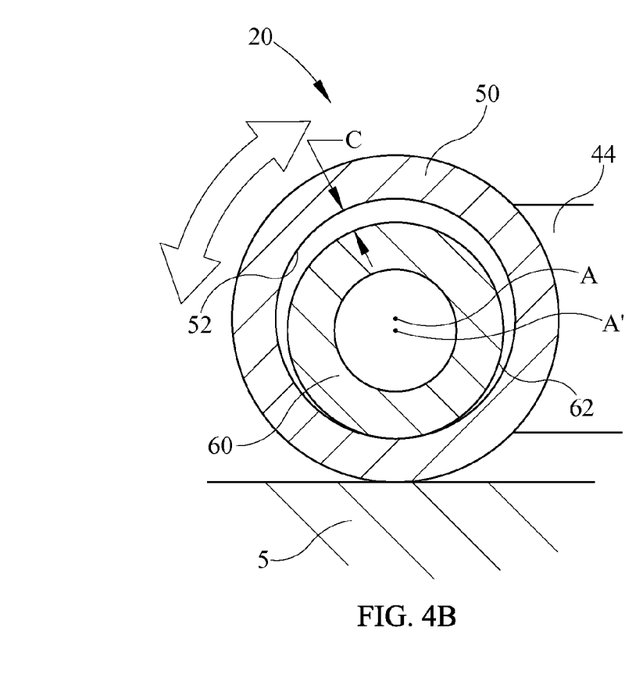
FIG. 4B is an enlarged partial sectional view showing a pipe-over-pipe mechanism of the planar framework of FIG. 4A in use.
Figure 6:
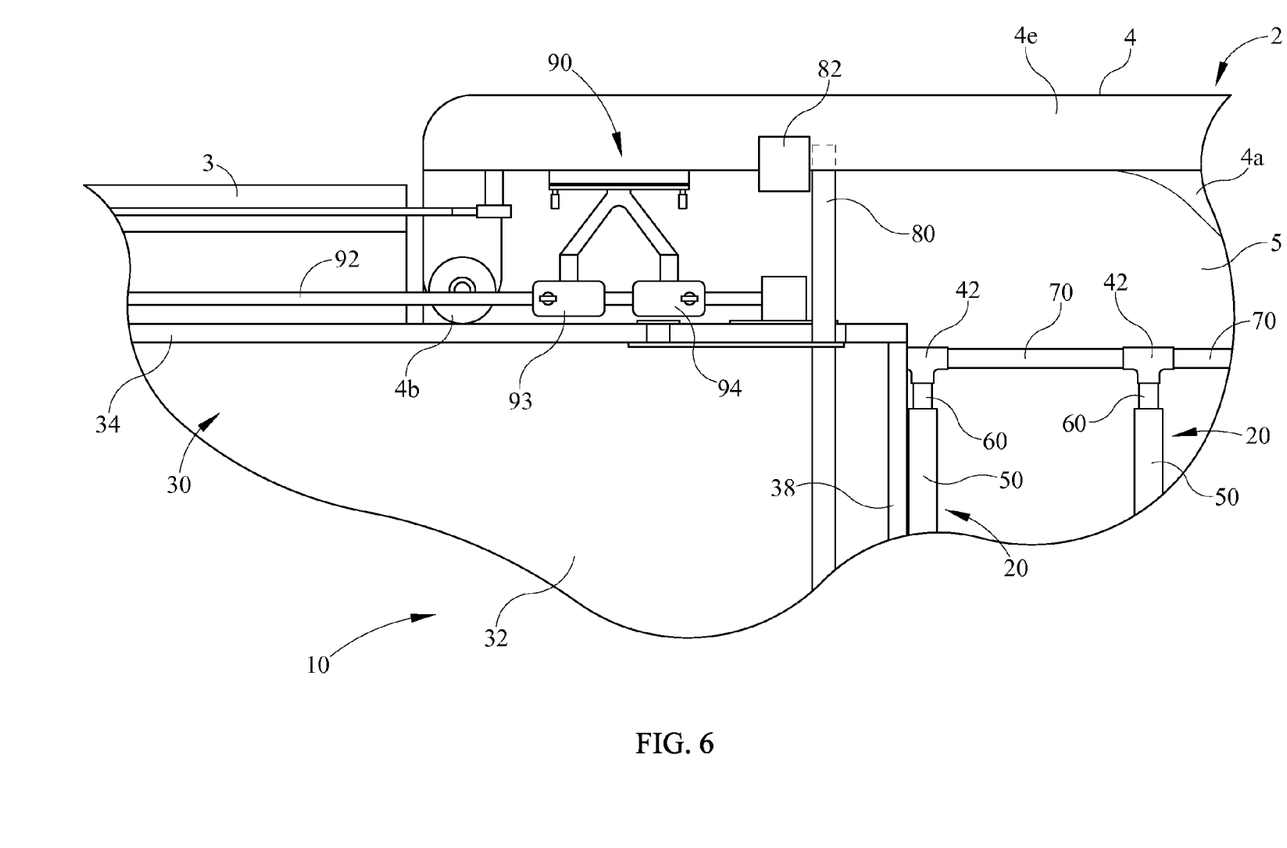
FIG. 6 is an enlarged partial top view of the roll-out bed system of FIG. 5.

As shown in FIGS. 4A, 5, and 6 a plurality of second pipes 60 are assembled and interconnected to each other by parallel third pipes 70 to form a planar framework 40 in which second pipes 60 are arranged in parallel but spaced from each other, similar to rungs on a ladder. A plurality of third pipes 70 are connected together and interconnected to second pipes to create a planar framework 40, by means of T-joints 42 and/or 90 degree elbows 44, as seen in FIG. 5. The combination of interconnected third pipes 70 is similar to the side rails of a ladder. Each second pipe 60 supports a respective first pipe 50 which results in the pipe-over-pipe mechanisms 20. Each pipe-over-pipe mechanism 20 is interconnected by the fixed and interconnected second pipes 60 of planar framework 40 creating a single unit. As shown in FIGS. 3, 4A, 5 and 6, planar framework 40 with parallel pipe-over-pipe mechanisms 20 is positioned between the top surface of bed floor 5 and bottom panel 32 of drawer 30. Planar framework 40 is dimensioned to fit between within wheel wells 4a and 6a and along the length of bed floor 5 while disposed under bottom panel 32 of drawer 30. Planar framework 40 may be formed by a number of different constructions, sizes, layouts, quantities of components, and still provide an interconnection of a plurality of pipe-over-pipe-mechanisms 20. For example, planar framework 40 is shown in FIG. 5 as a single row of parallel second pipes 60 and corresponding pipe-over-pipe mechanisms 20. Alternatively, a planar framework with two or more rows of coaxially aligned second pipes 60 could be used. Another alternative would be to have two or more rows with staggered or non-coaxially aligned second pipes 60 and corresponding pipe-over-pipe mechanisms 20.

Planar framework 40 serves to align pipe-over-pipe mechanisms 20 perpendicular to the direction of travel of drawer 30 as it moves in and out through opening 7 of truck bed 2. As drawer 30 is pulled outwardly from its internal position from truck bed 2 (FIG. 1) it slides over the plurality of rotating first pipes 50 of pipe-over-pipe mechanisms 20. As shown in FIG. 5, while drawer 30 is traveling over the rotating first pipes 50, planar framework 40 concurrently travels outwardly from bed 2 on pipe-over-pipe mechanisms 20 as a single unit. In a typical embodiment, drawer 30 may travel about one foot in distance over planar framework 40 for approximately every six inches planar framework 40 travels over bed 2 and onto tailgate 3. This allows planar framework 40 to move outward far enough to continue supporting drawer 30 but still remaining supported by tailgate 3 so that the drawer can travel to its desired position.

A stopping mechanism may be provided to limit the distance the drawer is allowed to travel. The stopping mechanism is typically provided to prevent drawer 30 from extending too far along bed 2 and tailgate 3, and in an extreme situation, from falling off the back of the vehicle. For example, a stopping mechanism as shown in FIGS. 5 and 6 may comprise an elongated bar 80 extending between left panel 34 and right panel 36 of drawer 30. The ends of elongated bar 80 respectively project under the upper edges 4e and 6e of side walls 4 and 6 of truck bed 2. When elongated bar 80 travels with drawer 30 to its desired maximum position (FIG. 2), the ends of bar 80 engage a pair of stops 82, 83 mounted to edges 4e and 6e, thereby restricting any further movement. The pair of stops 82 and 83 may be adjusted along edges 4e and 6e by the user to select the desired distance drawer 30 will be allowed to travel. Bar 80 also prevents the rear end of drawer 30 from tipping or rocking up off the planar framework 40. This is particularly helpful when the contents of drawer 30 are overloaded near open front end 31 of drawer 30 which would otherwise cause the drawer to tilt perhaps to the point where the contents would slide off. Various other stopping mechanisms will suggest themselves to those skilled in the art.

While drawer 30 is moving between an internal position (FIG. 1) and an external position (FIG. 2), a guiding mechanism may be provided to restrict the drawer to travel in a straight path along bed floor 5 on top of the pipe-over-pipe mechanisms 20. One embodiment of a guide mechanism is shown in FIGS. 3, 4A, 5, and 6 and comprises a pair of horizontally oriented wheels 4b, 6b which guide drawer 30 as it moves. The respective horizontal wheels 4b and 6b are affixed to truck bed 2 on each side of drawer 30 and center the drawer in the truck bed during its transitioning between the internal and external positions. Each horizontal wheel 4b and 6b makes rolling contact with drawer 30 respectively along the length of left panel 34 and right panel 36. The guide mechanism may also comprise alternative means which will suggest themselves to those skilled in the art.

As shown in FIGS. 3, 4A, 5, and 6, a locking device 90 may be employed with drawer 30 which not only locks the drawer in its retracted position within truck 1, but is constructed in a manner whereby a user can lock the drawer at different extended positions as well. As shown in FIGS. 2, 3, 4A, 5, and 6, a cable 92 is shown to extend lengthwise along the outside surface of left panel 34 from open front end 31 of drawer 30 to rear panel 38. A pair of one-directional locks 93 and 94 are mutual opposed and secured to the interior of left side wall 4 of bed 2. Cable 92 passes through each opposed one-directional lock 93 and 94. Each one-directional lock 92 and 93 is accessible to the user through opening 7 created by opening tailgate 3. To permit drawer 30 to travel in a first direction, the user will unlock one of the one-directional locks 93 or 94. To permit drawer 30 to travel in the opposite second direction the user can unlock the opposing one-directional lock 93 or 94. Drawer 30 can be fixed at different extended positions, when the user locks both one-directional locks 93 and 94 at the desired position of the drawer. Locking device 90 may comprise various means known to those skilled in the art in order to lock drawer 30 in different extended positions and still permit the use of pipe-over-pipe mechanism 20.

The roll-out drawer system 10 is not only easy to use in diverse applications, but it is readily mobile. Drawer 30 and planar framework 40 with pipe-over-pipe mechanisms 20 may be easily and entirely removed from truck bed 2. The system 10 need not be permanently attached to bed 2 of truck 1, nor does the bed floor need to be physically altered to accommodate planar framework 40 and drawer 30. No physical attachment to the body of bed 2 is require, such as drilling and bolting, to install framework 40 and pipe-over-pipe mechanisms 20 into the bed. Thus, the user can readily install and use system 10 when needed, but otherwise it can be removed and stored for later use. Also, the system 10 can be constructed to be applicable to heavy-duty use by employing aluminum, steel, or other metal construction, or in the case of light-duty applications, may be constructed of wood and PVC pipe. However, in any application the user can conveniently load and unload a variety of contents into the extended drawer 30 of system 10 in a position external to bed floor 5 that would otherwise be much more difficult to load and unload directly into bed 2 of vehicle 1.

It is understood that while certain embodiments of the invention have been illustrated and described, it is not limited thereto except insofar as such limitations are included in the following claims and allowable functional equivalents thereof.

I claim:

1. A roll-out drawer system comprising:
   at least one drawer able to travel in a first direction and an opposing second direction on top of a plurality of elongated pipe-over-pipe mechanisms transverse to said directions of travel of said at least one drawer, each said elongated pipe-over-pipe mechanism including at least one first rotatable pipe encircling at least one second fixed pipe, wherein said at least one first pipe rotates relative to and about said at least one second pipe, wherein a first axis of said at least one first pipe is aligned parallel with a second axis of said at least one second pipe; and
   a plurality of said at least one second pipes are interconnected to form at least one planar framework comprising said plurality of elongated pipe-over-pipe mechanisms.

2. The roll-out drawer system as in claim 1 wherein said plurality of elongated pipe-over-pipe mechanisms are parallel to each other and perpendicular to said directions of travel.

3. The roll-out drawer system as in claim 1 wherein said at least one drawer has a grasping device.

4. The roll-out drawer system as in claim 1 wherein each said elongated pipe-over-pipe mechanism has a clearance between an inner diameter of said at least one first pipe and an outer diameter of said at least one second pipe.

5. The roll-out drawer system as in claim 1 wherein said at least one drawer further comprises a stopping mechanism to limit travel in said first direction.

6. The roll-out drawer system as in claim 1 wherein said at least one planar framework is able to travel in said first direction and said opposing second direction concurrently with said at least one said drawer.

7. A roll-out drawer system including a pipe-over-pipe mechanism comprising:
   the bed of a vehicle having a bottom surface and at least one open end;
   a pipe-over-pipe mechanism including a plurality of first pipes each rotatably encircling one of a plurality of second fixed pipes and a first axis of said first pipes being aligned parallel with a second axis of said second pipes;
   said plurality of said second pipes being interconnected to form at least one planar framework parallel to the bottom surface of said bed;
   said at least one planar framework comprising a plurality of said pipe-over-pipe mechanisms parallel to the at least one open end of said bed, said plurality of said first pipes of said plurality of pipe-over-pipe mechanisms being in contact with said bottom surface of said bed; and
   at least one drawer travels upon and along with said plurality of pipe-over-pipe mechanisms when said plurality of said first pipes rotate relative to and about said plurality of said second pipes.

8. The roll-out drawer system as in claim 7 wherein said at least one drawer has a grasping device.

9. The roll-out drawer system as in claim 7 wherein each said pipe-over-pipe mechanism has a clearance between an inner diameter of each said first pipes and an outer diameter of each said second pipes.

10. The roll-out drawer system as in claim 7 wherein said at least one drawer has a stopping mechanism to limit travel of said at least one drawer.

11. The roll-out drawer system as in claim 7 further comprising a guide mechanism.

12. The roll-out drawer system as in claim 7 wherein each said at least one drawer and each said at least one planar framework travel concurrently between a first position in said bed to a second position wherein said at least one drawer extends out of said at least one open end of said bed.

13. A roll-out drawer system for a vehicle comprising:
   a pipe-over-pipe mechanism including a plurality of first rotatable pipes each rotatably encircling one of a plurality of second fixed pipes, wherein a first axis of each said first pipe is aligned parallel with a second axis of each said second pipe about which it is encircling;
   said plurality of said second pipes being parallel and interconnected to form a planar framework comprising a plurality of said pipe-over-pipe mechanisms; and
   a drawer positioned to travel along an outer surface of each said first pipe of said plurality of said pipe-over-pipe mechanisms when each of said plurality of first pipes rotates relative to and about said plurality of second pipes, said at least one planar framework being adapted to travel concurrently with said drawer but at a slower rate.

14. The roll-out drawer system as in claim 13 wherein said drawer has a grasping device.

15. The roll-out drawer system as in claim 13 wherein each said pipe-over-pipe mechanism has a clearance between an inner diameter of each of said first pipes and an outer diameter of each of said second pipes about which it is encircling.

16. The roll-out drawer system as in claim 13 wherein said drawer has a stopping mechanism to limit travel of said drawer.

17. The roll-out drawer system as in claim 13 wherein said plurality of second pipes of said planar framework are interconnected by a plurality of third pipes.

18. The roll-out drawer system as in claim 13 further comprising a guide mechanism.

19. The roll-out drawer system as in claim 13 wherein said planar framework has a substantially ladder shaped configuration.

\* \* \* \* \*